United States Patent Office 3,368,998
Patented Feb. 13, 1968

3,368,998
CRYSTALLINE POLYESTER POLYMER
Isaac Goodman, James Eric McIntyre, and Derek Harry Aldred, Harrogate, England, assignors to Imperial Chemical Industries Limited, London, England, a corporation of Great Britain
No Drawing. Filed May 20, 1963, Ser. No. 281,764
Claims priority, application Great Britain, May 22, 1962, 19,643/62
1 Claim. (Cl. 260—47)

The present invention relates to crystallising polyesters, more particularly to polyesters of irregular structure.

In the past it has been considered that the capacity for the crystallisation of fibre-forming polymers was related to the regularity of the chemical structure of such polymers. For example, C. W. Bunn in R. Hill's "Fibres from Synthetic Polymers" (Elsevier, 1953) states on page 232, referring to normally crystalline fibres, that "The molecules . . . are also arranged side by side with the full three dimensional order which is implied in the word 'crystalline.'" Again on page 233, he states "the connection between crystallisability and molecular regularity of structure would appear to be almost axiomatic." In F. W. Billmeyer's "Textbook of Polymer Chemistry" (Interscience Publishers Inc., N.Y., 1957, page 21) it is stated: "The close relationship between regularity of molecular structure and crystallisability has long been recognised. Typical crystalline polymers are those whose molecules are chemically and geometrically regular in nature. . . . Typical non-crystalline polymers, on the other hand, include those in which irregularity of structure occurs."

Practical experience heretofore has generally supported these propositions insofar as polymers derived from the condensation of two bifunctional intermediates, one of which is asymmetrically composed in the sense that its combination can occur in two geometrically non-identical modes with respect to the growth of the polymer chain from one end, are normally amorphous. The intermediates of the types referred to are, for example, dicarboxylic acids or dihydroxylic compounds or their functional derivatives, whose molecules are asymmetrical when viewed transversely to the direction of combination to form the polymer chain.

In view of the theoretical and practical considerations above described, it must be expected that when polymers are prepared from an asymmetrical acid and an asymmetrical dihydroxylic compound, there is very little chance of obtaining a crystalline product.

The phenomenon here described is to be distinguished from the case of polymers constituted from asymmetrical elements which fail to crystallise readily because of molecular impediments which reduce the rate of crystallisation to impracticably long periods but whose structures none the less conform to the accepted theoretical criteria for the potential display of crystallinity.

Examples of non-symmetrical linear polyesters which are amorphous in accordance with normal theoretical expectation, include the following:

(a) Farrow and Ward (Polymer 1960, 1, 330) showed that poly(ethylene methylterephthalate) is amorphous and uncrystallisable.

(b) Akiyoshi et al. (Chemical Abstracts 1955, 49, 2774) described poly(ethylene nitroterephthalate) as an apparently amorphous product.

(c) Cachia (Ann. Chim. 1959, 5) showed that poly-(ethylene chloroterephthalate) and poly(ethylene bromoterephthalate) unlike the analogous 2:5-dichloro and dibromo polyesters, are low softening, amorphous resins.

(d) Burkhard (United States Patent 2,902,469) showed that the ethylene polyesters of methoxyterephthalic, methoxyisophthalic and methoxyphthalic acids are amorphous resins, some of which are glassy at room temperature.

In each of these cases, the acid component of the polyester composition is an asymmetric unit. The non-crystallinity of these compounds has in general been ascribed to the combination of such units randomly along the polymer chain in the sense of head-to-head, head-to-tail placement, so that the molecular regularity of structure associated with full three dimensional order is not attainable.

An example is also known of the combination of an asymmetric acid with an asymmetric diol. In United States Specification 2,902,814 a polyester is described which is derived from pinic acid and 2:2-dimethyl-3-(2-hydroxyethyl)cyclobutylmethanol; this product is a tacky, transparent gum.

We have found that linear polyesters, unexpectedly showing crystallinity, can be formed by the combination of residues from certain asymmetrically substituted aromatic dicarboxylic acids and asymmetrical diols. By crystallinity is meant the possession of the capacity to diffract X-rays discretely and to display birefringence phenomena when examined between crossed Nicol prisms. Unless thermal decomposition first supervenes such substances may also undergo on heating a first order phase transformation of melting from the solid opaque, birefringent condition to the completely liquid state. The utility of the products of the invention lies in the known advantage of the occurrence of crystallinity in fibre-forming synthetic polymers which allows them to be dimensionally stable to considerably higher temperatures than analogous non-crystalline substances, and also to resist the action of solvents in which analogous amorphous polymers are normally much more readily soluble.

According to the present invention we provide linear, crystalline polyesters as hereinafter defined containing the repeating unit:

—CO—R'—COO—R''—O— where R' is a radical chosen from the group consisting of

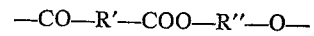

where R=—CH$_3$, —O alkyl or halogen,

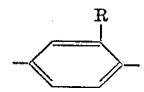

where R=—CH$_3$, —O alkyl or halogen,

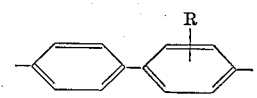

where R=—CH$_3$, O alkyl or halogen,

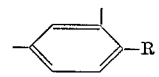

where $n$ is zero or 1,
$x$ and $y$ are dissimilar, being zero or an integer,

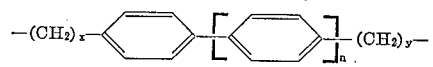

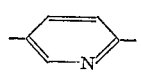

Biphenylene-2:4',
Biphenylene-3:4',
Naphthylene-1:6,
Naphthylene-1:7,
Monosubstituted naphthylene-1:4,
Monosubstituted naphthylene-1:5,
Monosubstituted naphthylene-2:6, and
Monosubstituted naphthylene-2:7.

R" is a radical chosen from the group consisting of

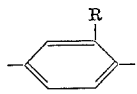

where R = —CH$_3$, —O alkyl or halogen,

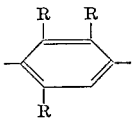

where R = —CH$_3$, O alkyl or halogen,

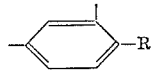

where R = —CH$_3$, —O alkyl or halogen,

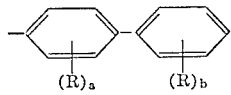

where R = —CH$_3$, —O alkyl or halogen,
$a$ and $b$ are dissimilar each being zero or an integer not greater than 4,

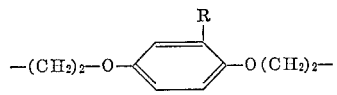

where R = —CH$_3$, —O alkyl or halogen,

where $x$ and $y$ are dissimilar being zero or an integer,
Naphthylene-1:6,
Naphthylene-1:7,
Monosubstituted naphthylene-1:4,
Monosubstituted naphthylene-1:5,
Monosubstituted naphthylene-2:6,
Monosubstituted naphthylene-2:7, and
Monosubstituted naphthylene-1:8.

In the term polyester we include copolyesters which may be formed by random combination of the asymmetric units or deliberately by, for example, the reaction of more than one dicarboxylic acid with at least one diol or of more than one diol with at least one dicarboxylic acid.

The crystallising polyesters of this invention may be made by any known method including the direct esterification of the diols with the dicarboxylic acids, the reaction of dialkyl or diaryl esters of the dicarboxylic acids with the diols, the reaction of the diesters of the diols with the dicarboxylic acids or the reaction of the dichlorides of the dicarboxylic acids with the diols or with the dianions of these. According to the structure of the products, they may crystallise spontaneously or may crystallise following treatment with organic solvents or by thermal annealing. The capacity of a crystallising substance to exist in a mestastable amorphous state before the onset of crystallisation may be an advantage in its fabrication to films or fibres.

The polyesters of the invention are doubly asymmetric in consequence of the structural asymmetry of each of their component units. Thus, considering two repeat units of the chain of a molecule based on poly-para-phenylene terephthalate but having a single substituent X in the acid segment and a single substituent Y in the diol segment, it will be seen that the group X can occupy any one of the positions designated by A around each ring in the following formula, whilst the group Y can occupy any one of the positions designated by B around each ring:

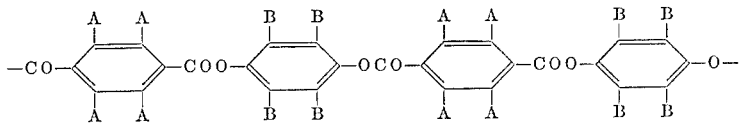

When further repeat units are considered in the light of the reaction conditions which will lead to a random direction of incorporation of the diol and diacid groups into the polymer chain, it will be seen that the resultant polymer structure contains the groups X and Y in an irregular sequence of positions and it is therefore surprising that the products, which cannot possess a three dimensionally ordered structure, should be crystallising.

It is known that the effect of copolymerisation upon crystalline polymers is normally to reduce crystallinity. It is therefore suprising that it is possible to incorporate into the doubly asymmetric polyesters of this invention a substantial proportion of a third reactant (dicarboxylic acid or diol) to give a crystalline product.

The following examples, in which all parts are by weight, illustrate, but do not limit, the scope of our invention.

COMPARATIVE EXAMPLE A

This describes the formation of a doubly asymmetric polyester which, in agreement with the normal expectation, is amorphous.

Dimethyl 3-methylbiphenyl-4:4'-dicarboxylate (5.7 parts) and 5-(para-3-hydroxypropylphenyl) pentan-1-ol were reacted together at 200–250° C. for 0.5 hour in the presence of a catalytic quantity of tertiary butyl titanate. Methanol was evolved and the pressure above the reaction mixture was reduced gradually whilst the temperature of the mixture was raised slowly to 278° C. at which temperature the material was polymerized under a pressure of 0.075 mm. of mercury for 1.5 hours. The polymeric product, containing the groups:

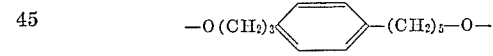

and

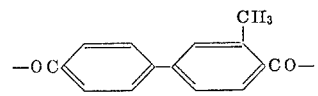

in the repeat unit, was a yellowish resin whose viscosity ratio (measured for a 1% solution in benzene at 25° C.) was 1.28. It was amorphous and resisted all attempts at crystallisation by solvent treatment or thermal annealing. The resin softened and commenced to flow between 64° C. and 76° C.

COMPARATIVE EXAMPLE B

Equimolar proportions of 2-chlorohydroquinone and homoterephthaloyl chloride were suspended in twenty volumes of dry ortho-dichlorobenzene and treated with passage of a stream of dry nitrogen whilst being heated at the reflux temperature of the solvent for 12 hours. Hydrogen chloride liberated during the reaction was swept away by the nitrogen current. The polymeric reaction product containing the groups:

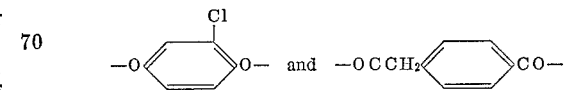

in the repeat unit was wholly soluble in ortho-dichlorobenzene even after cooling to room temperature, and was recovered by precipitation with petroleum ether (B.P. 100-

120° C.) followed by filtration. The product, which was obtained in 92.4% of the theoretical yield, was amorphous to X-rays and was not birefringent. On heating it softened to a liquid at 98–106° C.

Similar results were obtained when chlorohydroquinone was replaced by an equivalent quantity of 2-methylhydroquinone. The amorphous and non-birefringent product was also soluble in cold ortho-dichlorobenzene and was recovered in 94.7% yield by precipitation with petroleum ether. It softened to a liquid state over 90–102° C.

*Example 1.—Poly(methyl-para-phenylene methoxyterephthalate)*

A stream of dry oxygen-free nitrogen was passed through a mixture of 2-methylhydroquinone (62 parts) and 2-methoxyterephthaloyl chloride (116.5 parts) in dry ortho-dichlorobenzene (3000 parts) at 130° C. The temperature was raised to 180° C. during 1.5 hours and the mixture was allowed to reflux for a further 3 hours, hydrogen chloride produced by the reaction being swept away by the current of nitrogen. A homogeneous solution was formed which, on cooling, deposited poly(methyl-para-phenylene methoxyterephthalate) which was recovered by filtration. This polymer was initially amorphous but crystallised on heating to 210–240° C. and thereafter did not melt up to 350° C. A sample crystallised by heating gave a sharp X-ray powder diffraction pattern with rings showing spacings in the crystal at 7.5 A.U. (m), 5.3 A.U. (s) and 3.7 A.U. (m).

*Example 2.—Poly(chloro-para-phenylene methylterephthalate)*

2-chlorohydroquinone (72 parts) and 2-methylterephthaloyl chloride (108.5 parts) in ortho-dichlorobenzene (3000 parts) were reacted with passage of a current of dry nitrogen according to the method of Example 1. The total reaction time was extended to 10.5 hours. The polymeric product was almost wholly soluble in boiling ortho-dichlorobenzene but separated on cooling as a heavy white powder which was recovered by filtration and then dried in vacuo at 80° C. for 24 hours. Addition of petroleum ether (B.P. 100–120° C.) to the filtrate caused the precipitation of a further small quantity of polymer.

The insoluble fraction, comprising over 80% of the total product, was initially amorphous but became birefringent on heating to 218–232° C. On further heating it softened at about 250° C. and then solidified to a highly birefringent mass which did not melt below 350° C. It gave a sharp X-ray powder diffraction pattern with rings showing spacings in the crystal of 6.5 A.U. (m), 3.8 A.U. (m, possibly doublet) and 3.5 A.U. (w, possibly doublet). The fraction obtained by precipitation showed a similar behaviour on heating but was somewhat less crystalline to X-rays, the principal spacings occurring at 6.5 A.U. (w) and 3.7 A.U. (w).

*Example 3.—Poly(methyl-para-phenylene methylterephthalate)*

2 - methylhydroquinone (12.4 parts) and 2-methylterephthaloyl chloride (21.7 parts) in 600 parts of dry ortho-dichlorobenzene were reacted with passage of a current of dry nitrogen according to the method of Example 1; the total reaction time was 8.25 hours. The product separated during the reaction as a heavy precipitate and was recovered after cooling by filtration as a slightly off-white powder (25 parts). The polymer was initially amorphous but became birefringent on heating to 230–240° C. On further heating it softened at 250–255° C. and showed signs of flow but then solidified to a highly birefringent mass which did not melt below 350° C. On examination by X-rays it then gave a powder diffraction pattern characteristic of a highly crystalline polymer with principal crystal spacings at 5 A.U. (s, probably doublet), 3.7 A.U. (m, probably doublet) and 2.9 A.U. (w).

*Example 4.—Copoly(methyl-para-phenylene methylterephthalate/sebacate)*

A copolymer having-2-methyl-para-phenylene methylterephthalate and 2-methyl-para-phenylene sebacate units in the molar proportion of 60:40 was prepared by heating 2-methylhydroquinone (12.4 parts), 2-methylterephthaloyl chloride (13.02 parts) and sebacoyl chloride (9.56 parts) in boiling ortho-dichlorobenzene (600 parts) for 9.5 hours. A current of dry nitrogen was used as in the earlier examples to sweep away the liberated hydrogen chloride. The polymeric product which remained dissolved in the orthodichlorobenzene on cooling was recovered in 96.1% of theoretical yield by precipitation with petroleum ether (B.P. 100–120° C.). After thorough drying in vacuo it formed a pliable, highly birefringement mass, melting to a liquid over the range 98–125° C.

*Example 5.—Poly(chloro-para-phenylene methoxyterephthalate)*

A mixture of chlorohydroquinone (72.3 parts) and methoxyterephthaloyl chloride (116.5 parts) in "Aroclor 1242" (2500 parts) was heated at temperatures from 200–260° C. while a stream of dry oxygen-free nitrogen was passed through. After 6 hours, 93% of the theoretically obtainable amount of hydrogen chloride had been evolved and a polymer precipitated gradually from the hot solution. On cooling this product was recovered, washed with acetone in a household blender, filtered off and dried.

The product which was recovered in 95% yield was a white powder which was birefringent, and softened but did not melt at 350° C. Its glass-rubber transition temperature was found to be 185° C. and it was not soluble in any common organic solvent. X-ray diffraction examination showed it to be highly crystalline.

*Example 6.—Poly(methoxy-para-phenylene methoxyterephthalate)*

2-Methoxyhydroquinone (140 parts) and methoxyterephthaloyl chloride (233 parts) were heated in "Aroclor 1242" (2500 parts) at temperatures from 200–260° C. while a stream of dry oxygen-free nitrogen was passed through. An amount of hydrogen chloride equal to 92% of that theoretically obtainable for complete reaction was evolved after 4 hours and the product precipitated from the hot solution. On cooling, it was washed with acetone in a household blender, and recovered in 87% yield after filtration and drying. The product was a white birefringent powder, unmelted at 350° C. Its glass-rubber transition temperature was found to be 165° C. It was insoluble in ortho-chlorophenol and dichloroacetic acid. X-ray powder diffraction examination showed it to be crystalline.

*Example 7.—Poly(bromo-para-phenylene methoxyterephthalate)*

The reaction was performed as in Example 5 using bromohydroquinone (95 parts) and methoxyterephthaloyl chloride (116 parts) in "Aroclor 1242" (2500 parts). An amount of hydrogen chloride equal to 97.5% of that theoretically obtainable for complete reaction was evolved in 6 hours. The product recovered in 82% yield was a white powder, which was birefringent, and did not melt below 350° C. It was insoluble in ortho-chlorophenol and in dichloroacetic acid. X-ray powder diffraction examination showed it to be crystalline.

*Example 8.—Poly(bromo-para-phenylene chloroterephthalate)*

The reaction was performed as in Example 5 using bromohydroquinone (95 parts), chloroterephthaloyl chloride (118 parts) and "Aroclor 1242" (3000 parts). After 10 hours 92% of the amount of hydrogen chloride theoretically obtainable for complete reaction had been evolved, and the product was recovered in 80% yield as a white birefringent powder, which did not melt at 350°

C. It was insoluble in ortho-chlorophenol and in dichloroacetic acid.

*Example 9.—Poly(methoxy-para-phenylene chloroterephthalate)*

The reaction was performed as in Example 5 using methoxyhydroquinone (140 parts), chloroterephthaloyl chloride (237 parts) and "Aroclor 1242" (2500 parts). After 8 hours, 94% of the theoretically obtainable amount of hydrogen chloride had been evolved and the product was recovered in 97% yield as an off-white powder, which was birefringent and did not melt below 350° C. It was insoluble in ortho-chlorophenol or dichloroacetic acid. X-ray powder diffraction examination showed it to be crystalline.

*Example 10.—Poly(methyl-para-phenylene chloroterephthalate)*

The reaction was performed as in Example 5 using toluhydroquinone (62 parts), chloroterephthaloyl chloride (118.8 parts) and "Aroclor 1242" (3000 parts). After 20 hours at temperatures up to 300° C., 93% of the theoretically obtainable amount of hydrogen chloride had been evolved. The product precipitated from the hot solution and was recovered in 82% yield as an off-white powder, initially amorphous, which on heating to about 290° C. became highly birefringent but remained unmelted at 350° C. It was insoluble in ortho-chlorophenol and dichloroacetic acid. X-ray powder diffraction examination showed it to be crystalline.

*Example 11.—Copoly(methyl-para-phenylene methoxyterephthalate/isophthalate) (50:50)*

A copolyester containing 50 mole percent of methyl-para-phenylene isophthalate groups was prepared by reaction of toluhydroquinone (124 parts), methoxyterephthaloyl chloride (116.5 parts) and isophthaloyl chloride (101.5 parts) in "Aroclor 1242" (3000 parts) at 200–270° C. After 6 hours, 70% of the theoretically obtainable amount of hydrogen chloride had been evolved and the hot yellow solution was distinctly viscous. Continued heating at temperatures up to 280° C. for a further 15 hours produced a stiff gel which became quite solid on cooling. 80% of the theoretical amount of hydrogen chloride was evolved. The product was extracted for 6 hours in a Soxhlet apparatus with chloroform to remove occluded "Aroclor 1242" from the gel, which fell to a powder upon drying. The product, recovered in 65% yield was a pale-tan coloured brittle solid, weakly birefringent, melting at about 360° C. Solutions of the polymer in hot "Aroclor" could be used for the production of highly thermostable coatings on metal and ceramic surfaces and on wires.

*Example 12.—Copoly(chloro-para-phenylene methoxyterephthalate/isophthalate) (50:50)*

A copolyester containing 50 mole percent of chloro-para-phenylene isophthalate groups was prepared by reaction of chlorohydroquinone (144.5 parts), methoxyterephthaloyl chloride (116.5 parts) and isophthaloyl chloride (101.5 parts) in "Aroclor 1242" (3000 parts). After 5 hours at 250–300° C. approximately 75% of the theoretically obtainable amount of hydrogen chloride had been evolved and the yellow solution had become viscous. Further heating for 8 hours longer at 270° C. gave a stiff gel and 90% of the theoretical amount of hydrogen chloride was evolved. The product was worked up as in Example 11 to give a pale-tan coloured solid which was weakly birefringent; M.P. 340–350° C. The product was further purified by dissolving it in hot ortho-chlorophenol and precipitating it by adding the filtered polymer solution to a large excess of methanol with vigorous stirring. The precipitated product was recovered by filtration. After drying, a white powder was obtained in 65% yield, which was initially amorphous, but on heating to about 240° C. became birefringent, melting at 340–350° C. The viscosity ratio of a 1% solution in ortho-chlorophenol at 25° C. was 3.76. Filaments could be drawn from the molten polymer at about 380° C.

*Example 13.—Copoly(bromo-para-phenylene methoxyterephthalate/sebacate) (50:50)*

A copolyester containing 50 mole percent of bromo-para-phenylene isophthalate was prepared by reaction of bromohydroquinone (190 parts), methoxyterephthaloyl chloride (117 parts) and isophthaloyl chloride (101.5 parts) in "Aroclor 1242" (3000 parts) as in Example 12. The amount of hydrogen chloride evolved was 90% of that theoretically obtainable for complete reaction and the product, obtained as a semi-solid gel was repeatedly extracted with hot acetone to remove the "Aroclor." The product, obtained in 85% yield, was an off-white powder, initially amorphous, but upon heating to about 240° C. becoming highly birefringent and crystaline, and melting at 350° C. The viscosity ratio of a 1% solution in o-chlorophenol at 25° C. was 3.2. Filaments could be drawn from the melt at about 380° C.

*Example 14.—Copoly(methyl-para-phenylene methoxyterephthalate/sebacate) (50:50)*

A copolyester containing 50 mole percent of methyl-para-phenylene sebacate groups was prepared by reaction of toluhydroquinone (124 parts), methoxyterephthaloyl chloride (117 parts) and sebacoyl chloride (120 parts) in "Aroclor 1242" (3000 parts). The temperature was kept at 200° C. until approximately 60% of the theoretically obtainable amount of hydrogen chloride had been evolved, after which it was raised to 280° C. After 10 hours 96% of the theoretically obtainable amount of hydrogen chloride had been evolved and the cooled clear viscous solution of polymer was poured into a large excess of methanol to give a pasty mass of product. This was purified by precipitation from ortho-chlorophenol into methanol and recovered in 50% yield as an off-white, rubbery, pliable mass, which was birefringent and melted at 250° C. The viscosity ratio of a 1% solution in ortho-chlorophenol at 25° C. was 2.43. Solutions of the copolymer in hot ortho-chlorophenol could be used for the coating of metal and ceramic surfaces and wires.

*Example 15.—Copoly(methyl-para-phenylene methoxyterephthalate/sebacate) (80:20)*

A copolyester containing 20 mole percent of methyl-para-phenylene sebacate linkages was prepared by reaction of toluhydroquinone (124 parts), methoxyterephthaloyl chloride (186 parts) and sebacoyl chloride (47.2 parts) in "Aroclor 1242" as in Example 14. The amount of hydrogen chloride evolved was 96% of that theoretically obtainable for complete reaction and the product was recovered in 84% yield as a white powder, which was crystalline and birefringent, M.P. 340° C. The viscosity ratio of a 1% solution in ortho-chlorophenol at 25° C. was 2.99. Filaments could be drawn from the melt at 370° C.

*Example 16.—Copoly(methyl-para-phenylene methoxyterephthalate/sebacate) (90:10)*

A copolyester containing a 10% molar concentration of methyl p-phenylene sebacate linkages was prepared by reaction of toluhydroquinone (124 parts), methoxyterephthaloyl chloride (210 parts) and sebacoyl chloride (23.9 parts) in "Aroclor 1242" as in Example 14. 96% of the theoretically obtainable amount of hydrogen chloride was evolved, a very viscous solution was formed and the polymer precipitated on cooling. The product was washed repeatedly with acetone and recovered in 80% yield as a white powder, initially amorphous, but becoming highly birefringent on heating to about 300° C. after which it did not melt below 350° C. The viscosity ratio of a 1% solution in ortho-chlorophenol at 25° was 7.76.

What we claim is:

1. A linear crystalline polyester polymer consisting of at least 50% of repeating units of the formula:

—CO—R'—COO—R''—O— wherein each of the groups R' and R'', which may be the same or different, is of the formula:

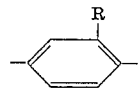

wherein R is a radical taken from the group consisting of Cl, Br, —CH$_3$ and —OCH$_3$, and up to 50% of repeating units of the formula:

—CO—R'''—COO—R''—O— wherein R'' is as defined above and R''' is taken from the group consisting of

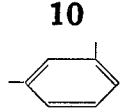

and —(CH$_2$)$_8$—.

References Cited

UNITED STATES PATENTS

| | | | |
|---|---|---|---|
| 2,894,934 | 7/1959 | Burkhard | 260—47 |
| 2,902,469 | 9/1959 | Burkhard | 260—47 |
| 3,160,603 | 12/1964 | Holub | 260—47 |
| 3,256,242 | 6/1966 | Morgan | 260—47 |

FOREIGN PATENTS

| | | |
|---|---|---|
| 716,877 | 10/1954 | Great Britain. |
| 968,403 | 9/1964 | Great Britain. |

WILLIAM H. SHORT, *Primary Examiner.*

L. P. QUAST, C. A. WENDEL, *Assistant Examiners.*